United States Patent
Maak et al.

(10) Patent No.: US 8,559,085 B2
(45) Date of Patent: Oct. 15, 2013

(54) FOCUSING SYSTEM COMPRISING ACOUSTO-OPTIC DEFLECTORS FOR FOCUSING AN ELECTROMAGNETIC BEAM

(75) Inventors: Pal Andor Maak, Budapest (HU); J. Balazs Rozsa, Budapest (HU); Gergely Katona, Budapest (HU); E. Szilveszter Vizi, Budapest (HU); Mate Veress, Budapest (HU); Attila Csakanyi, Sulysap (HU); Gergely Szalay, Budapest (HU)

(73) Assignee: Femtonics Kft., Budapest (HU)

( * ) Notice: Subject to any disclaimer, the term of this patent is extended or adjusted under 35 U.S.C. 154(b) by 126 days.

(21) Appl. No.: 13/138,059

(22) PCT Filed: Dec. 30, 2009

(86) PCT No.: PCT/HU2009/000112
§ 371 (c)(1),
(2), (4) Date: Sep. 21, 2011

(87) PCT Pub. No.: WO2010/076579
PCT Pub. Date: Jul. 8, 2010

(65) Prior Publication Data
US 2012/0044569 A1    Feb. 23, 2012

(30) Foreign Application Priority Data

Dec. 31, 2008   (HU) .................................. 0800781

(51) Int. Cl.
*G02B 26/08* (2006.01)
(52) U.S. Cl.
USPC ..................................... 359/198.1; 359/201.1
(58) Field of Classification Search
USPC ........... 359/198.1, 199.1, 199.4, 201.1, 201.2
See application file for complete search history.

(56) References Cited

U.S. PATENT DOCUMENTS

2010/0282984 A1*  11/2010  Kreysing et al. ........... 250/492.1

* cited by examiner

*Primary Examiner* — Euncha Cherry
(74) *Attorney, Agent, or Firm* — Olson & Cepuritis, Ltd.

(57) ABSTRACT

A focusing system for focusing an electromagnetic beam for three-dimensional random access applications comprises a first pair of acousto-optic deflectors for focusing an electromagnetic beam in an X-Z plane, and a second pair of acousto-optic deflectors for focusing an electromagnetic beam in a Y-Z plane substantially perpendicular to the X-Z plane. The second pair of acousto-optic deflectors is arranged between the acousto-optic deflectors of the first pair of acousto-optic deflectors such that the first and fourth acousto-optic deflectors of the system belong to the first pair of acousto-optic deflectors and the second and third acousto-optic deflectors of the system belong to the second pair of acousto-optic deflectors.

7 Claims, 6 Drawing Sheets

FOCUSING SYSTEM COMPRISING ACOUSTO-OPTIC DEFLECTORS FOR FOCUSING AN ELECTROMAGNETIC BEAM

FIELD OF THE INVENTION

The present invention relates to a focusing system for focusing an electromagnetic beam for three-dimensional random access applications, the system comprising a first pair of acousto-optic deflectors for focusing an electromagnetic beam in an X-Z plane, and a second pair of acOusto-optic deflectors for focusing an electromagnetic beam in a Y-Z plane being substantially perpendicular to the X-Z plane.

BACKGROUND OF THE INVENTION

Three-dimensional (3D) random access laser scanning technologies have great importance in performing measurements on biological specimens (including scanning, imaging, detection, excitation, etc.) e.g. imaging biological structures or mapping fluorescent markers of cell surface receptors or performing measurements such as uncaging/photosimulation, FRET (Fluorescence resonance energy transfer), FLIM (Fluorescence lifetime imaging), etc.

Commonly used 3D laser scanning microscopes are either confocal microscopes or multi-photon (two-photon) microscopes. In the confocal microscope technology a pinhole is arranged before the detector to filter out light reflected from any other plane than the focus plane of the microscope objective. Thereby it is possible to image planes lying in different depths within a sample (e.g. a biological specimen).

Two-photon laser scanning microscopes use a laser light of lower energy of which two photons are needed to excite a flourophore in a quantum event, resulting in the emission of a fluorescence photon, which is then detected by a detector. The probability of a near simultaneous absorption of two photons is extremely low requiring a high flux of excitation photons, thus two-photon excitation practically only occurs in the focal spot of the laser beam, i.e. a small ellipsoidal volume having typically a size of approximately 300 nm×300 nm×1000 nm. Generally a femtosecond pulsed laser is used to provide the required photon flux for the two-photon excitation, while keeping the average laser beam intensity sufficiently low.

When applying either of the above-mentioned technologies the conventional way to perform the scanning in 2D or 3D is to move the sample stage e.g. via stepping motors; however this is complicated to implement when using submersed specimen chambers or when electrical recording is performed on the biological specimen with microelectrodes. Accordingly, in the case of analysing biological specimens it is often preferred to move the focus spot of the laser beam instead of moving the specimen. In confocal and multi-photon microscopes 2D scanning of the specimen can be achieved by deflecting the laser beam to scan different points of a focal plane (XY plane). This scanning is conventionally achieved by deflecting the laser beam within a given focal plane (XY plane) via mechano-optical deflecting means such as deflecting mirrors mounted on galvanometric scanners. Changing the depth of focus during measurement (or scanning along the z axis) can be achieved for example by displacing the objective along its optical axis (Z axis) e.g. using a piezo-positioner.

The inertia of the mechanical scanning components used in the conventional setups (i.e. the scanning mirrors and the microscope objective) presents certain limitations with regard to the achievable scanning speed, since the scanning components need to be physically moved in order to perform 3D scanning.

Rapid acousto-optic deflectors (AOD) have been proposed as an alternative to the conventional mechanic solutions.

Kaplan et al. ("Acousto-optic lens with very fast focus scanning", OPTICS LETTERS/Vol. 26, No. 14/Jul. 15, 2001)) proposed an acousto-optic lens made up of two AODs with counter propagating acoustic waves locked in phase, to achieve purely focus shift without lateral moving of the beam. Changing the focus of the acousto-optic lens was achieved by changing the sweep rate of the acoustic frequencies through the acousto-optic devices.

In U.S. Pat. No. 7,227,127 the above principle is made use of in order to provide 3D scanning. The focus of the beam can be moved in space in a diamond like structure by using four acousto-optic deflectors, two for both lateral directions (X and Y). Lateral scanning is a result of the acoustic frequency differences of the two AODs diffracting in the same lateral direction, whereas depth focusing (i.e. focus shift along the microscope optical axis named Z axis) is achieved by changing the sweep rate of the acoustic frequencies in the same AODs. Thus the focus point can be quasi independently adjusted in the X-Z and Y-Z planes, where Z is the longitudinal direction corresponding to the optical axis of the device. This also leads to strong astigmatism, when the frequency sweep rates in the X and Y deflecting units are not perfectly matched.

Furthermore, there are various problems associated with the state of the art AOD 3D scanning technology such as spatial and temporal dispersion, especially when applied in combination with multi-photon scanning technologies.

Short femtosecond pulses applied in multi-photon technologies necessarily imply larger spectral width, i.e. a larger spread of wavelengths exists in a shorter pulse leading to greater spatial dispersion (chromatic aberration). Temporal dispersion (i.e. elongation of the pulse in time) is caused by the fact that different wavelengths of light travel at different speeds through the AOD.

Prior art AOD systems eliminate spatial and temporal dispersion to a more or less extent by applying complicated dispersion compensating elements.

It has been shown in many previous papers and patents that the highest angle range and resolution can be obtained with AODs using optically anisotropic diffraction, namely a special configuration where the acousto-optic diffraction is achieved with a shear acoustic wave and the polarization of the first order diffracted beam is nearly perpendicular to that of the incident-beam. This configuration works well in a number of optically anisotropic materials with slow shear acoustic modes like $PbMnO_4$ or $TeO_2$. In this patent we propose a new configuration of a scanner preferably comprising $TeO_2$ deflectors operating in anisotropic configuration to obtain the highest possible angular (optical) resolution at the output.

When an anisotropic AOD deflects an incoming laser beam, the polarisation of the first order beam is rotated by 90 degrees compared to the incoming laser beam and the zero order undeflected transmitted beam.

It is commonly accepted that the bandwidth obtainable with an anisotropic AOD is considerably higher when using extraordinary incident light instead of ordinary incident light due to the interaction geometry. In order to operate all Bragg cells with extraordinary light it is proposed in WO 2008/6032061 to provide half wave plates between the AODs of each AOD pair operating in the X-Z plane and in the Y-Z plane, respectively, for rotating the polarisation of the first order beam deflected by the first AOD of the pair, thus providing extraordinary incident light for the second AOD of the pair as well. The use of half wave plates has many drawbacks: the wave plates are angle sensitive limiting the usable divergence and propagation angle of the passing beams, moreover wave plates are wavelength sensitive, thus it may cause bandwidth reduction and material dispersion in case of the high bandwidth femtosecond pulses used in multi-photon technologies.

As an alternative, the same document proposes arranging the AODs of the two pairs alternately, i.e. the first X-Z AOD is followed by the first Y-Z AOD, followed by the second X-Z AOD, followed by the second Y-Z AOD. As it is commonly known an AOD operating in the X-Z plane and an AOD operating in the Y-Z plane require perpendicularly polarised light with respect to each other, thus the rotated polarisation of the first order deflected beam exiting the X-Z AOD is suitable for the consequent Y-Z AOD and vice versa.

However, the inventors of the present invention have found that the high bandwidth commonly associated with the use of extraordinary incident light is obtainable only in a limited incident angle range. The angle tolerance is usually three-five times less then the angle range provided by the same deflector in the deflected (scanned) beam. Therefore if two similar anisotropic deflectors are arranged consecutively so that both deflect in the same plane (e.g. X-Z plane) and the polarization is rotated between them so as both operate with extraordinary polarized incident beam, the overall deflection angle range is automatically reduced by three-five times despite of the difference in the center acoustic frequency between the cells. This reduces both the scanned X-Y range in the focal plane and the focal length variation range within the X-Z and Y-Z planes, respectively.

Figure 1:
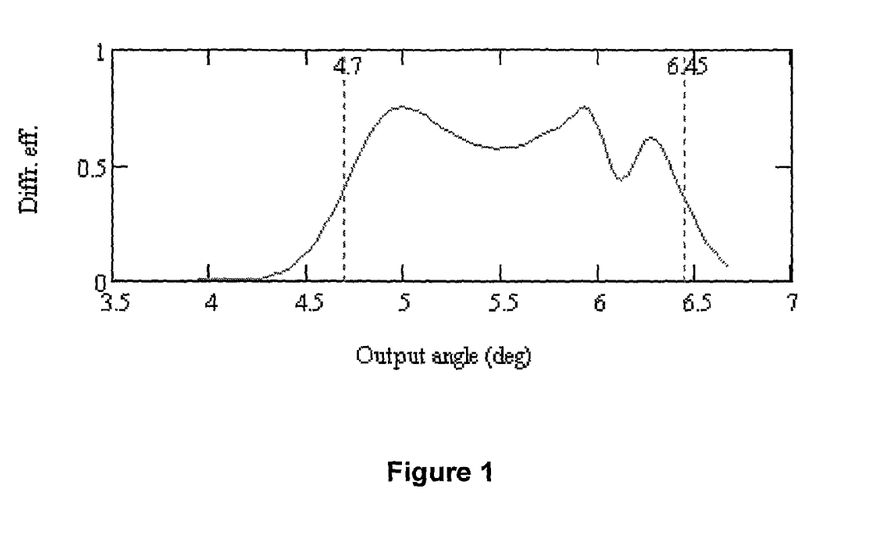
FIG. 1 shows the relation between the diffraction efficiency and deflection angle range of an anisotropic AOD operated with extraordinary polarized incident optical beam.
Figure 2:
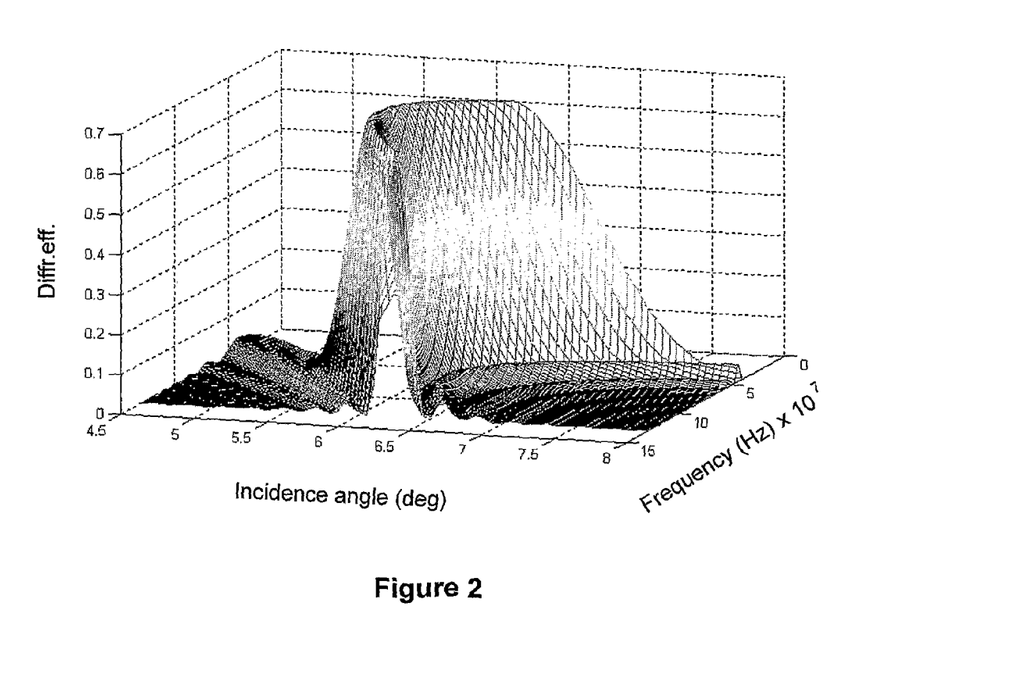
FIG. 2 shows the dependence of the diffraction efficiency of an anisotropic deflector operated with extraordinary polarized incident beam on the acoustic frequency and incidence angle

FIG. 1 shows the relation between the diffraction efficiency of an anisotropic AOD operated with extraordinary polarized incident beam and the deflection angle at constant acoustic power. Note that considerable diffraction efficiency can be obtained approximately in a 1.7 deg range. FIG. 2. shows a typical dependence of the diffraction efficiency of an anisotropic AOD operating with extraordinary polarized incident beam on the acoustic frequency and incidence angle. It is obvious that the incidence angle range over which considerable diffraction efficiency is achieved depends on the acoustic frequency and is about 0.5 to 1 degrees wide.

Figure 3:
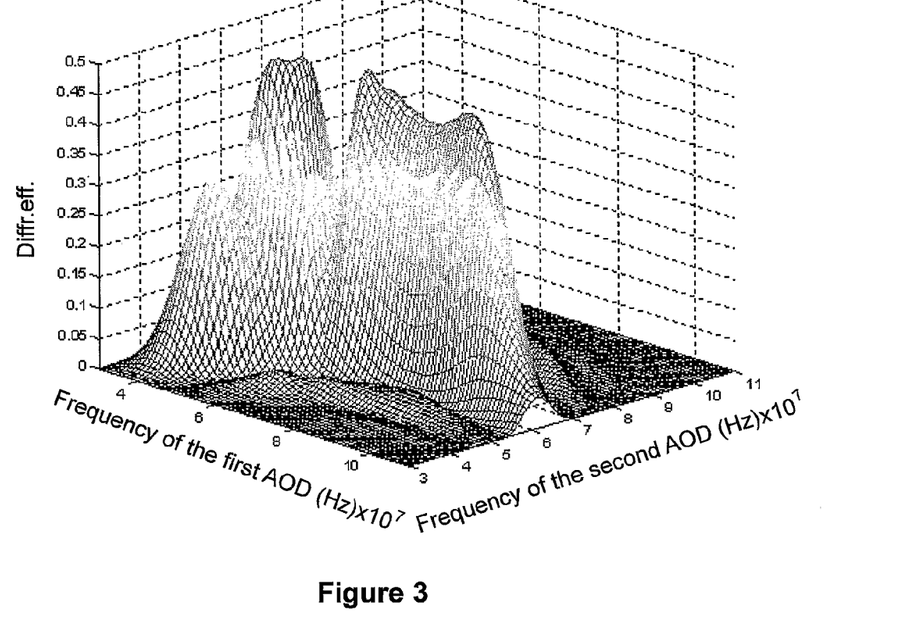
FIG. 3 is a diagram of the diffraction bandwidth when two consecutive X-Z AODs operate with extraordinary polarised incident beam.

When both AODs operate with extraordinary incidence at constant electric power (a very common and simple driving scheme) and constant optical input, the dependence of the output optical intensity on the frequencies of both AOD's will be as shown in FIG. 3. The deep minimum in the band is caused by the second order diffraction characteristic to these types of deflectors. The effect of the second order diffraction appears in the case of the higher bandwidth obtainable with the extraordinary polarized optical incidence and causes a deep minimum in the overall bandwidth. This avoids the effective use of this portion of the frequency band for e.g. focusing, since the serious output optical intensity variation with frequency in this area causes distortion of the focused spot. However, this effect is reduced when the acoustic (more precisely the driving electric) power is reduced, but in this case the first order efficiency is also reduced. Compensation of this effect by driving with frequency dependent power is also limited because of this reason.

Figure 4:
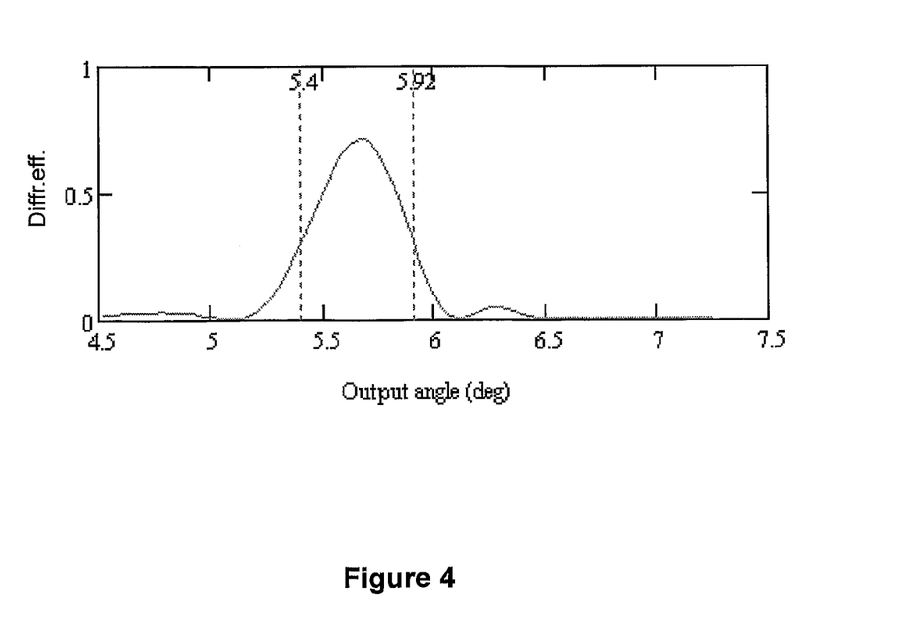
FIG. 4 shows the relation between the diffraction efficiency and deflection angle range of an anisotropic AOD operated with ordinary polarized incident optical beam

On the other hand, when the first AOD of a pair deflecting in the same transversal plane is operating with ordinary incident wave, and the second one with extraordinary incident one, the arrangement dispenses with the need for a half wave plate. The ordinary optical incidence in the first AOD provides a smaller output angle range than the extraordinary incidence, but still bigger than the input angle range accepted by the second AOD, as shown in FIG. 4. and compared with FIG. 2.

Figure 5:
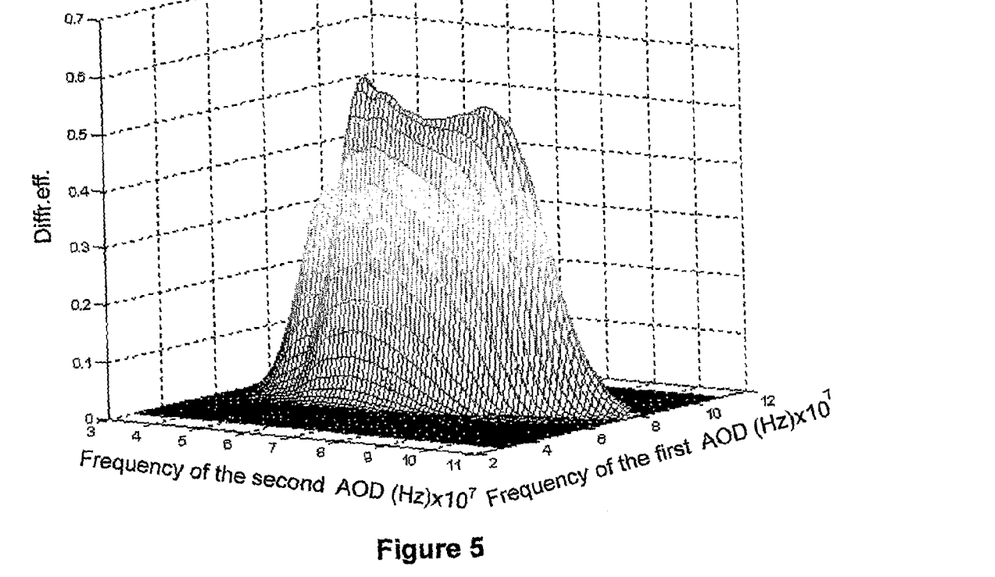
FIG. 5 is a diagram of the diffraction bandwidth when a first X-Z AOD operates with ordinary polarised incident beam and a second X-Z AOD operates with extraordinary polarised incident beam.

FIG. 5 shows the diffraction bandwidth in the X-Z plane with two consecutive anisotropic AODs, wherein the first AOD operates with ordinary, the second AOD operates with extraordinary polarized incident beam. When compared with FIG. 3 it is immediately evident that here the second order diffraction has a reduced effect because it is apparent only in the second AOD, where extraordinary optical incidence is applied. This means that this configuration has practically a bigger bandwidth than the first configuration where both AOD's were operated with extraordinary polarized optical inputs.

It is an object of the invention to overcome the problems associated with the prior art laser scanning microscopes.

In particular, it is an object of the invention to provide an anisotropic AOD arrangement, which eliminates the need of half wave plates, and at the same time allows for maximal bandwidth.

It is a further object of the invention to effectively combine the AODs in order to obtain 3D scanning with optimum spatial and temporal resolution, meaning optimum spatial and temporal dispersion when light with broad wavelength spectrum (e.g. very short pulse) is used together with effective compensation for the strong imaging aberrations caused by the acousto-optic devices.

BRIEF SUMMARY OF TILE INVENTION

The above objects are achieved by a focusing system for focusing an electromagnetic beam for three-dimensional random access applications, the system comprising a first pair of acousto-optic deflectors for focusing an electromagnetic beam in an X-Z plane, and a second pair of acousto-optic deflectors for focusing an electromagnetic beam in a Y-Z plane being substantially perpendicular to the X-Z plane. According to the invention, the second pair of acousto-optic deflectors are arranged between the acousto-optic deflectors of the first pair of acousto-optic deflectors, such that the first and fourth acousto-optic deflectors of the system belong to the first pair of acousto-optic deflectors and the second and third acousto-optic deflectors of the system belong to the second pair of acousto-optic deflectors.

Further advantageous embodiments of the invention are defined in the attached dependent claims.

Further details of the invention will be apparent from the accompanying figures and exemplary embodiments.

DETAILED DESCRIPTION OF THE INVENTION

Figure 6:
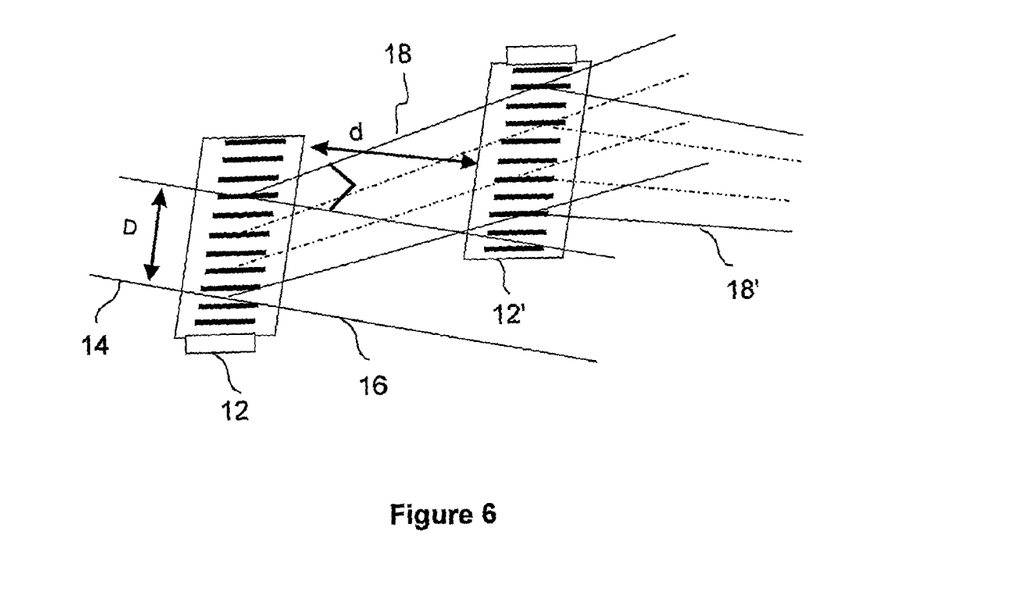
FIG. 6 is a schematic illustration of the basics of beam deflection via a pair of AODs.

FIG. 6 is a schematic illustration of the basics of beam deflection via a pair of AODs 10 comprising a first AOD 12 and a second AOD 12' having counter propagating acoustic waves for performing scanning in the X-Z plane in a known way. The crystal lattice constants of the crystal making up the AOD 12, 12' are slightly modified by the acoustic waves propagating therethrough, thereby the AOD crystals act as an optical grating of modifiable grating constant.

Accordingly, an incident electromagnetic beam 14 (generally a laser beam) is split by the first AOD 12 into an undeflected zero order beam 16, a first order deflected beam 18 and higher order deflected beams which are neglected in the following discussion as generally only the first order beam 16 is of interest. The first order beam 18' deflected (diffracted) by the second AOD 12' will have the same direction as the incident beam 14 and consequently as the zero order beam 16 deflected by the first AOD 12. Therefore this zero order beam 16 must be separated from the twice diffracted first order beam 18' emerging from the second AOD 12'. There are two commonly applied technologies for separating the zero order beam 16. If the AODs are made up of anisotropic crystals and use anisotropic Bragg diffraction involving slow shear acoustic waves the polarisation of the first order diffracted beam 18 is rotated by 90 degrees compared to the undiffracted zero order beam 16, thus the zero order beam 16 may simply be filtered out via a polarising filter. According to the second technology the twice diffracted first order beam 18' and the zero order beam 16 are separated spatially: the spacing d between the two AODs 12, 12' must be greater than that predicted by the beam aperture D of the first AOD 12 and the first order diffraction angle α. In practice the required d spacing is approximately d=10*D. This imposes that the two counter-propagating acoustic beams cannot be realized within the same AOD.

When two separate AODs 12, 12' are used, as shown in FIG. 6, several problems arise.

The first problem is that the first order beam 18 deflected by the first AOD 12 forms a divergent beam which spreads out considerably along the d spacing between the two AODs 12, 12', thus at the location of the second AOD 12' the total beam width will require a greater optical aperture, meaning an increased portion of the acoustic beam in the second AOD 12'. Thus, if the frequency sweep rates are the same in both AODs 12, 12' (e.g. using the same electric waveform to drive both AODs as is commonly suggested in the prior art) the effective focal length of the structure will change considerably as compared to the theoretical formulae given e.g. in the above cited Kaplan et al. publication (formulae 2 and 3) or formulae 1 and 4 given in Reddy et al., "Fast three-dimensional laser scanning scheme using acousto-optic light deflectors", J. of Biomed. Optics Vol 10(6) 064038 (2005). The cited formulae are formulated for the case when the AOD spacing is neglected, or when imaging is achieved.

The inventors of the present invention have found that this effect may be compensated by choosing different frequency sweep rates for the acoustic beams in the two consecutive AODs 12, 12', which, however, increases driving complexity (preferably needs digital signal synthesis to avoid analog synchronization and phase shifting problems).

The second problem with the arrangement illustrated in FIG. 6 is that it limits the usable sweep rates, and thus the available focal lengths, since at too high sweep rates the spatial spread of the beam emerging from the first AOD 12 prevents it to fit entirely into the optical aperture of the second AOD 12'. Both problems were solved already in the literature by using a telecentric imaging system, which does not change the angular spread of the beam emerging from the first AOD 12 and images its aperture to the second AOD 12'. This solution allows the use of formulae 4 from the above cited Reddy et al. publication to estimate the focal length obtainable in either the X-Z or Y-Z plane. However the telecentric optical system uses at least two focusing optical elements, in the simplest version telecentric lenses, which may introduce imaging aberrations, especially at high beam divergence. Moreover, lenses introduce inherently chromatic (material) dispersion, which must be compensated for when building systems involving high bandwidth femtosecond pulses (e.g. multi-photon microscopes).

When combining two pairs of AODs to achieve both X and Y scanning additional problems occur, the solution of which is not given in the prior art.

Figure 7:
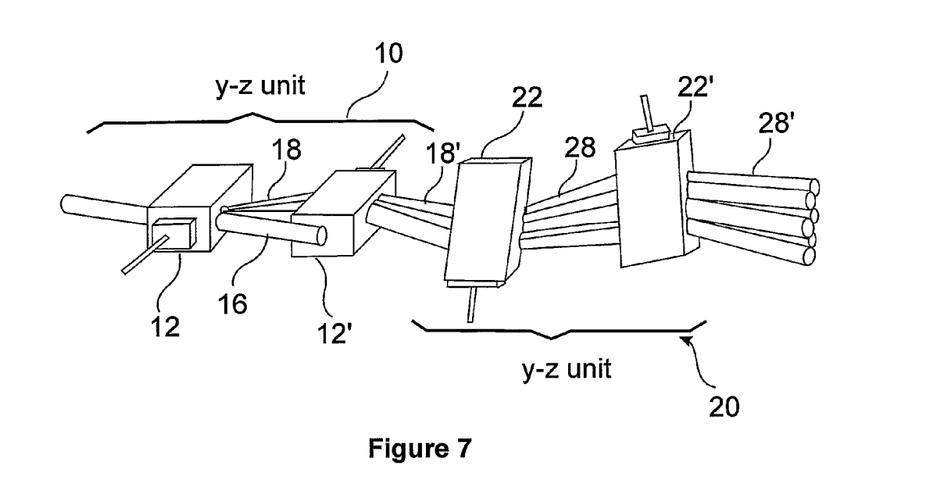
FIG. 7 is a schematic illustration of a prior art focusing system comprising two consecutive pairs of AODs focusing in the X-Z and Y-Z planes.

FIG. 7 illustrates a prior art focusing system comprising two consecutive pairs of AODs 10 and 20. The first pair 10 comprising a first and a second AOD 12, 12' provided for focusing in the X-Z plane, while the second pair 20 comprising a third and a fourth AOD 22, 22' being provided for focusing in the Y-Z plane. As explained above any two consecutive AODs 12, 12', 22, 22' must be arranged with an appropriate spacing for spatially separating the zero order beam 16 and the multi-deflected first order beams 18', 28, 28'. The spacing imposes that the optical aperture of the consecutive AODs 12', 22, 22' must be increased relative to the beam diameter, in both lateral directions X and Y, therefore the angular spread and thus the available focal length range of the system will be seriously limited.

Figure 8:
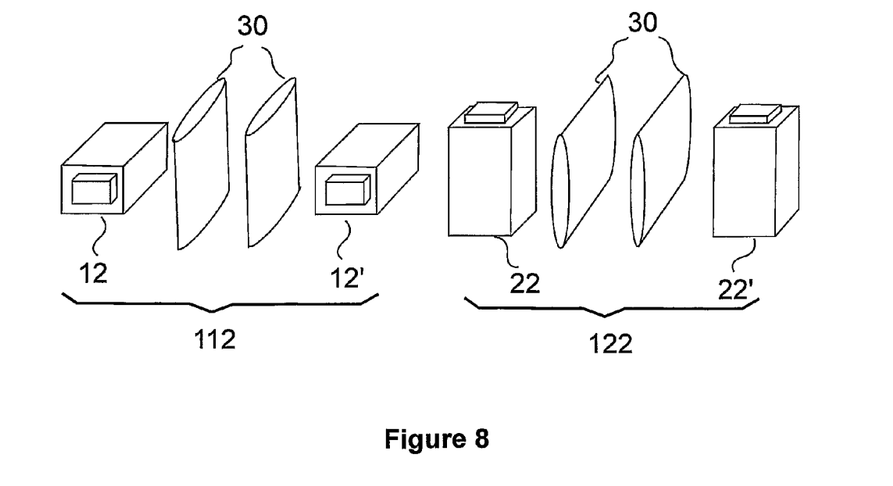
FIG. 8 is a schematic illustration of a prior art focusing system comprising two consecutive pairs of AODs focusing in the X-Z and Y-Z planes and cylindrical lenses provided between the AODs of each pair.

A modified version of the above system is shown in the FIG. 8, wherein the two X-Z AODs. 12, 12' and the two Y-Z AODs 22, 22' are connected through cylinder lenses 30. This system solves the problem of mismatch between the beam aperture and the AOD aperture within the X-Z unit 112 deflecting in the X-Z plane and the Y-Z unit 122 deflecting in the Y-Z plane, since the beam is expanded due to spatial spread only in the X-Z and Y-Z planes, respectively. However, when the units 112, 122 are simply combined to obtain 3D scanning, the beam will spread spatially in the X-Z plane when it emerges from the first unit 112 deflecting in the X-Z plane, thus aperture mismatch in X directions will still occur in the Y-Z unit 122.

Figure 9:
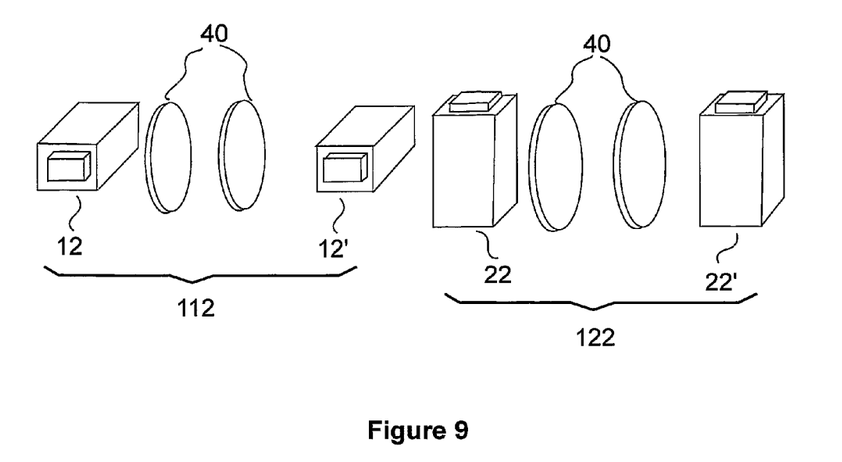
FIG. 9 is a schematic illustration of a prior art focusing system comprising two consecutive pairs of AODs focusing in the X-Z and Y-Z planes and spherical lenses provided between the AODs of each pair.
Figure 10:
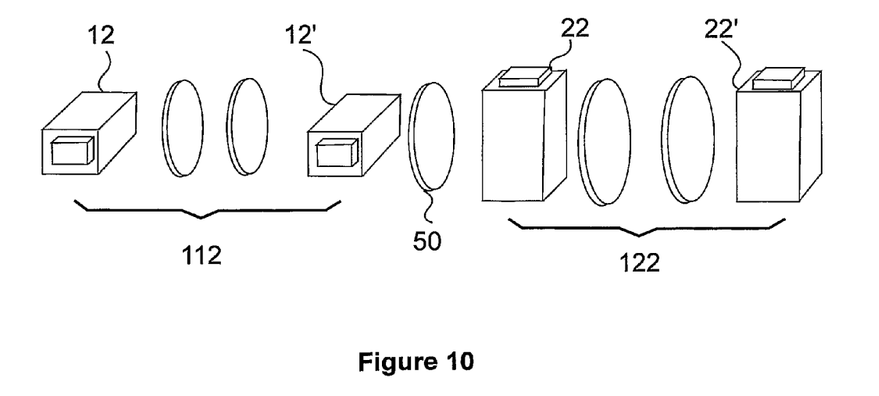
FIG. 10 is a schematic illustration of the prior art focusing system according to FIG. 6 which has been modified to include a half wave plate between the consecutive AOD pairs.
Figure 11:
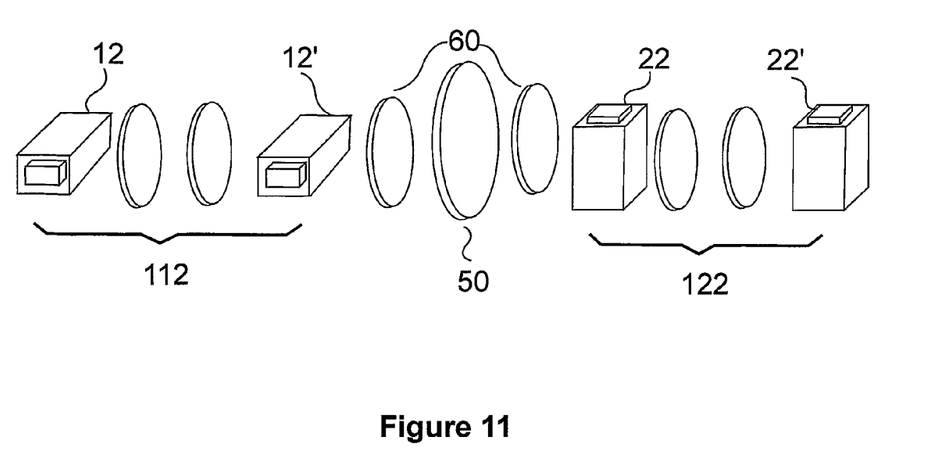
FIG. 11 is a schematic illustration of the prior art focusing system according to FIG. 10 which has been modified to include spherical lenses downstream and upstream of the half wave plate between the consecutive AOD pairs.

Even when spherical lenses 40 forming telecentric systems 42 are used instead of the cylindrical lenses 33, as shown in FIG. 9, the problem persists because the beam aperture at the entrance of the Y-Z unit 122 varies in the X-Z plane due to the variable divergence imposed by the X-Z unit 112. If the second AOD 12' of the X-Z unit 112 and the first AOD 22 of the Y-Z unit could be placed very close together the focal range loss may be tolerable, but in most practical cases this is not possible.

In particular, the AODs with the highest bandwidth and useful diffraction efficiency use anisotropic Bragg diffraction involving slow shear acoustic waves. The polarization of the first order diffracted optical beam is rotated by 90 degrees, and as explained above, it is not indifferent, which is the input polarization, since the configuration is optimized for either extraordinary or ordinary input (generally for extraordinary incident light).

Contrary to the teachings of WO 2008/032061 the inventors have found that when two identical AODs are used in the X-Z unit 112, best overall bandwidth is obtained if the first AOD 12 rotates the polarization by 90 degrees and the second AOD 12' rotates it back. Thus the polarization of the twice diffracted beam 18' emerging from the two X-Z diffracting AODs 12, 12' is the same as that entering the system.

Preferably all the AODs 12, 12', 22, 22' are of the same kind, in order to allow for less complex control of the drive signals. In this case, for optimum diffraction efficiency, the consecutive AOD 22 deflecting in the Y-Z direction needs a polarization rotated by 90 degrees as compared to the polarisation of the incident beam 12 required by the first X-Z AOD 12. However, the twice diffracted beam 18' emerging from the second AOD 12' has the same polarisation as the incident beam 12. To overcome this problem the prior art system must be completed with a half wave plate 50, as depicted in FIG. 5. Alternatively differently designed AODs 22, 22' may be used for deflecting in the Y-Z plane, which however increases drive complexity and cannot provide the same optimal bandwidth delivered by those used for the deflection in the X-Z plane. The half wave plate 50 is the simplest solution being capable of rotating the polarization by 90 degrees. However, the use of half wave plates involves three drawbacks:

the second AOD 12' of the X-Z unit 112 and the first AOD 22 of the Y-Z unit 122 cannot be placed close enough to avoid aperture mismatch;

the half wave plate 50 is angle sensitive having no optimal performance over the full scanning range and so limits the scannable 3D volume by limiting the available divergence and propagation angle of the first order diffracted beam 18' emerging from the X-Z unit 112;

the half wave plate 50 is also wavelength sensitive, so when using the system with high bandwidth femtosecond pulses it introduces bandwidth reduction and material dispersion.

The last two drawbacks persist even when the system shown in FIG. 8 is used, wherein a further telecentric system 60 is provided for eliminating the aperture mismatch problems between the first and second units 112 and 122 caused by variable spatial beam spreads through imaging. However the limitations on the scannable 3D volume imposed by the half wave plate 50 persist. Additionally, the telecentric systems 42, 60 are subject to aberrations when the beam angles and the used optical apertures vary, i.e. when the effective focal length of the full system is changed. Each optical element introduces material dispersion as well that must be compensated for.

Figure 12:
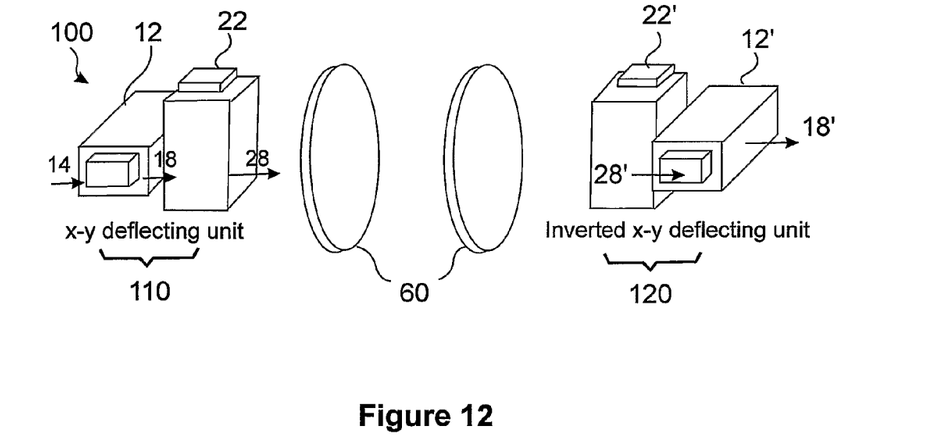
FIG. 12 is a schematic illustration of an embodiment of the present invention.

FIG. 12. is a schematic illustration of an embodiment of the focusing system 100 according to the present invention. The need of applying a half wave plate 50 is eliminated by interposing the second pair of AODs 20 between the first and second AODs 12, 12' of the first pair of AODs 10. The polarisation of the incident beam 14 is rotated by 90 degrees in the first order deflected beam 18 transmitted by the first AOD 12 deflecting in the X-Z plane. Thus the polarisation of the first order deflected beam 18 satisfies the polarisation criteria of the consecutive AOD 22 deflecting in the Y-Z plane. For example if the first AOD 12 deflecting in the X-Z plane requires ordinary light, an incoming ordinary incident beam 14 is deflected by the first AOD 12 so that its polarisation is rotated by 90 degrees. The polarisation of the first order beam 18 is thus extraordinary with respect to the first AOD 12, but ordinary with respect to the consecutive AOD 22 arranged to deflect in the Y-Z plane. Thereby the same type of AOD 22 can be used for deflecting in the Y-Z plane, which, as explained previously, decreases driving complexity and allows for an optimum overall bandwidth.

The ordinary first order beam 18 enters the consecutive AOD 22 and is diffracted thereby. The polarisation of the first order beam 28 is again rotated by 90 degrees and rotated back again to its original polarisation state by the second AOD 22' of the second pair of AODs 20. Thus the first order beam 28' exiting the second pair of AODs 20 has the same polarisation as the first order beam 18 entering it—which is the right polarisation for the second AOD 12' of the first pair of AODs 10. As explained before, the pair of AODs 10, 20 function best if the polarisation of the incoming extraordinary beam 14 is rotated by 90 degrees by the first AOD 12, 22 and rotated back again by the second AOD 12', 22'. By interposing the Y-Z deflecting AOD pair 20 between the first and second AODs 12, 12' making up the first AOD pair 10 this principal is not violated and at the same time extra polarisation rotators (such as the half wave plate 50) are rendered unnecessary.

In the embodiment illustrated in FIG. 12 the first AODs 12, 22 of each pair 10, 20 are arranged adjacent to each other thereby eliminating aperture mismatch over the full available scanning angle and beam divergence range. In this optimized setup a symmetrical scanning range in X and Y directions can be obtained using the same type of AODs 12, 22 performing anisotropic Bragg diffraction. The output of the first unit 110 comprising the first two AODs 12, 22 is imaged onto the second, inverted unit 120, which eliminates temporal shift of the output beam during measurement of single points in the scanning range. The imaging is performed via known telecentric lens system 60.

One of the main advantages of the focusing system 100 according to the invention is that the polarization of the beams 14, 18, 28, 28' entering into each particular AOD 12, 22, 22' and 12', is optimal for wide bandwidth anisotropic Bragg diffraction. This is achieved by inverting the order of the AODs 22', 12' deflecting in the X-Z and Y-Z directions in the second unit 120.

The inventive system 100 illustrated in FIG. 12 also has the advantage of using only two imaging optical elements (i.e. the telecentric system 60) minimizing material dispersion. The symmetric structure minimizes the astigmatism of the overall optical system 100, however spherical and coma aberrations are also present when the beam angles and divergences are changed.

The suggested arrangement of X-Z, Y-Z, –Y-Z, –X-Z AODs 12, 22, 22', 12' provides the best possible bandwidth when four deflectors with the same configuration and parameters are used.

The focusing system 100 illustrated in FIG. 12 comprises one telecentric system 60 between the second and third AODs 22, 22' forming the second pair of AODs 20 deflecting in the Y-Z plane. The AODs 12, 22 of the first unit 110 and the AODs 22', 12' of the second unit 120 are substantially adjacent to each other in order to eliminate aperture mismatch. The first and second units 110, 120 may both comprise a polarisation filter (e.g. a polariser) for filtering out the zero order transmitted beam 16 having the same polarisation as the incident beam 14 and 28 respectively.

In a second embodiment of the focusing system 100 according to the present invention the AODs 12, 22 and 22', 12' of the first and second units 110, 120 may be spaced apart and may include a telecentric relay system 60 between the first and second AODs 12, 22 and between the third and fourth AODs 22', 12' as well. The second and third AODs 22, 22' may be arranged adjacent each other, preferably separated by a polarisation filter for filtering out the zero order beam 26 transmitted by the second AOD 22. This arrangement optimizes the number of lenses and provides only tolerable aperture mismatches between the second and third (Y-Z, –Y-Z) AODs 22, 22'.

Alternatively, the four AODs 12, 22, 22', 12' may all be arranged adjacently, preferably being separated from each other only by polarisation filters for filtering out the zero order beam transmitted by the first, second and third AODs 12, 22, 22'.

Any other optical elements may be used between the AODs, 12, 22, 22', 12' as the case may be, however one of the benefits of the invention resides in eliminating the need of polarisation rotators, thus all the additional optical elements preferably maintain the polarisation of a transmitted portion of an electromagnetic beam. Such optical elements are understood to include polarisation filters as well, since a polarisation filter does not change the polarisation of the portion of the beam, which is allowed to pass (i.e. transmitted).

In order to overcome the bandwidth reduction an AOD cell with increased bandwidth can be used for the –X-Z and –Y-Z deflection (i.e. AODs 12' and 22'). The bandwidth can be increased by reducing the interaction length, the width of the acoustic beam in the direction of light propagation. This also reduces the diffraction efficiency that may be partially compensated by an increase of the acoustic power, but here the acoustic power density must be increased leading to serious thermal problems. Power density increase is generally limited by thermal drift and diffraction efficiency decrease due to increased temperature.

In a second aspect of the invention we suggest the use of a modified AOD, where instead of reducing the interaction length the optical aperture is increased. Here the acoustic power should also be increased for the same diffraction efficiency, but the power density remains the same, reducing the above described thermal problems. For example according to the second embodiment of the present invention the first and second AODs of a pair operating either in X-Z or Y-Z plane, 12, 12' and 22, 22' can be connected optically with a telecentric lens system 60 with the magnification adjusted to the aperture differences e.g. if the aperture of the second AOD 22' is five times bigger than the aperture of the first AOD 22, the telecentric system should have a magnification of five. The aperture increase results in angle decrease, so the input angle range of the second AOD (e.g. 22') can be fit to its angle tolerance range for high bandwidth. In this way the bandwidth loss can be reduced in both cases, where the second AOD of the pair is operated either with extraordinary or with ordinary waves.

The above-described embodiments are intended only as illustrating examples and are not to be considered as limiting the invention. Various modifications will be apparent to a person skilled in the art without departing from the scope of protection determined by the attached claims.

The invention claimed is:

1. Focusing system for focusing an electromagnetic beam for three-dimensional random access applications, the system comprising a first pair (10) of acousto-optic deflectors (12, 12') for focusing an electromagnetic beam in an X-Z plane, and a second pair (20) of acousto-optic deflectors (22, 22') for focusing an electromagnetic beam in a Y-Z plane being substantially perpendicular to the X-Z plane, characterised in that the second pair (20) of acousto-optic deflectors (22, 22') is arranged between the acousto-optic deflectors (12, 12') of the first pair (10) of acousto-optic deflectors, such that the acousto-optic deflectors together form an array of deflectors with acousto-optic deflectors (12, 12') of the first pair (10) being the first and fourth acousto-optic deflectors in the array and acousto-optic deflectors (22, 22') of the second pair (20) being the second and third acousto-optic deflectors in the array.

2. The focusing system according to claim 1, wherein the acousto-optic deflectors (12, 22, 12', 22') comprise anisotropic crystals and the deflectors are used in shear acoustic mode.

3. The focusing system according to claim 1, wherein the acousto-optic deflectors (12, 12', 22, 22') of each pair (10, 20) are arranged substantially parallel to each other.

4. The focusing system according to claim 1, wherein a polariser is arranged between the first and second acousto-optic deflectors (12, 22), and/or between the second and third acousto-optic deflectors (22, 22'), and/or between the third and fourth acousto-optic deflectors (22', 12').

5. The focusing system according to claim 1, wherein a telecentric relay system (60) is arranged between the first and second acousto-optic deflectors (12, 22), and/or between the second and third acousto-optic deflectors (22, 22'), and/or between the third and fourth acousto-optic deflectors (22', 12').

6. The focusing system according to claim 1, wherein optical elements present between the acousto-optic deflectors maintain polarisation of a transmitted portion of an electromagnetic beam.

7. The focusing system according to claim 1, wherein optical aperture of one of the second, third or fourth acousto-optic deflectors (22, 22', 12') is increased and the acousto-optic deflector with the increased optical aperture is separated from an adjacent upstream acousto-optic deflector by a telecentric relay system (60) with magnification adjusted to aperture difference therebetween.

* * * * *